US012693424B2

(12) United States Patent (10) Patent No.: US 12,693,424 B2
Sai et al. (45) Date of Patent: Jul. 28, 2026

(54) IMAGE PROCESSING APPARATUS FOR CLASSIFYING THREE-DIMENSIONAL DATA INTO CLUSTERS BASED ON RECOGNIZED OBJECTS AND DISTANCES

(71) Applicant: Kabushiki Kaisha Toshiba, Tokyo (JP)

(72) Inventors: Akihide Sai, Yokohama Kanagawa (JP); Hisaaki Katagiri, Kawasaki Kanagawa (JP); Satoshi Kondo, Kawasaki Kanagawa (JP); Tuan Thanh Ta, Kawasaki Kanagawa (JP); Yutaka Ota, Yokohama Kanagawa (JP); Toshiki Sugimoto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 283 days.

(21) Appl. No.: 18/465,100

(22) Filed: Sep. 11, 2023

(65) Prior Publication Data

US 2024/0233409 A1 Jul. 11, 2024

(30) Foreign Application Priority Data

Jan. 10, 2023 (JP) ................................ 2023-001974

(51) Int. Cl.
G01S 17/894 (2020.01)
G01S 17/89 (2020.01)
(Continued)

(52) U.S. Cl.
CPC ............ G01S 17/894 (2020.01); G01S 17/89 (2013.01); G06T 5/20 (2013.01); G06T 5/70 (2024.01);
(Continued)

(58) Field of Classification Search
CPC ......... G01S 17/89; G01S 17/894; G06T 5/20; G06T 5/70; G06T 5/94; G06T 7/215;
(Continued)

(56) References Cited

U.S. PATENT DOCUMENTS 9,123,132 B2 9/2015 Tamura
11,961,306 B2 4/2024 Kato
(Continued)

FOREIGN PATENT DOCUMENTS

CN 106951905 A 7/2017
CN 111369666 A * 7/2020 ............. G06T 7/254
(Continued)

OTHER PUBLICATIONS

Extended European Search Report mailed Jul. 9, 2024 in corresponding European Patent Application No. 23195362.1, 15 pages.
(Continued)

*Primary Examiner* — John Villecco
*Assistant Examiner* — Joshua B. Crockett
(74) *Attorney, Agent, or Firm* — Kim & Stewart LLP

(57) ABSTRACT
An image processing apparatus comprises processing circuitry, and the processing circuitry is configured to detect light intensity data including at least one of a reflected light intensity of light reflected on an object or an ambient light intensity based on a reception signal corresponding to a reflected light from the object, generate a two-dimensional image based on the light intensity data, recognize the object in the two-dimensional image, generate three-dimensional data by detecting a distance to the object based on the reception signal, and classify the three-dimensional data into one or more clusters based on the recognized object and the distance to the detected object.

19 Claims, 19 Drawing Sheets

(51) Int. Cl.

| | | |
|---|---|---|
| *G06T 5/20* | (2006.01) | |
| *G06T 5/70* | (2024.01) | |
| *G06T 5/94* | (2024.01) | |
| *G06T 7/215* | (2017.01) | |
| *G06T 7/521* | (2017.01) | |
| *G06T 11/00* | (2026.01) | |
| *G06V 10/762* | (2022.01) | |
| *G06V 10/764* | (2022.01) | |
| *G06V 20/64* | (2022.01) | |

(52) U.S. Cl.
CPC ................ *G06T 5/94* (2024.01); *G06T 7/215* (2017.01); *G06T 7/521* (2017.01); *G06T 11/00* (2013.01); *G06V 10/762* (2022.01); *G06V 10/764* (2022.01); *G06V 20/64* (2022.01); *G06T 2207/10028* (2013.01)

(58) Field of Classification Search
CPC .................... G06T 7/521; G06T 11/00; G06T 2207/10028; G06V 10/762; G06V 10/764; G06V 20/64
See application file for complete search history.

(56) References Cited

U.S. PATENT DOCUMENTS

| | | | | |
|---|---|---|---|---|
| 12,307,580 | B2 * | 5/2025 | Lindmeier | .............. G06F 3/017 |
| 2015/0332463 | A1 * | 11/2015 | Galera | ..................... H04N 7/18 |
| | | | | 382/103 |

| | | | | |
|---|---|---|---|---|
| 2017/0039436 | A1 | 2/2017 | Chen et al. | |
| 2019/0206118 | A1 * | 7/2019 | Radel | ..................... G02B 30/40 |
| 2019/0387216 | A1 | 12/2019 | Hicks | |
| 2021/0334944 | A1 | 10/2021 | Spickermann | |
| 2022/0004739 | A1 | 1/2022 | Vaello Paños | |
| 2022/0035003 | A1 * | 2/2022 | Mosier | ................... G08B 29/24 |
| 2022/0139094 | A1 | 5/2022 | Yoshimi | |
| 2023/0020725 | A1 | 1/2023 | Ishii | |
| 2023/0162454 | A1 * | 5/2023 | McCall | ................... G06F 3/011 |
| | | | | 345/633 |
| 2023/0334673 | A1 * | 10/2023 | Rajan | ..................... G06V 10/26 |
| 2024/0272300 | A1 | 8/2024 | Uehara | |

FOREIGN PATENT DOCUMENTS

| | | |
|---|---|---|
| JP | 2007-156917 A | 6/2007 |
| JP | 2009-147922 A | 7/2009 |
| JP | 2018-173707 A | 11/2018 |
| JP | 2020-165679 A | 10/2020 |
| JP | 2021-511556 A | 5/2021 |
| JP | 2021-099698 A | 7/2021 |
| JP | 2021-168142 A | 10/2021 |
| JP | 2022-189080 A | 12/2022 |
| WO | 2019/110824 A1 | 6/2019 |
| WO | 2020/179065 A1 | 9/2020 |

OTHER PUBLICATIONS

Notice of Reasons for Refusal mailed Mar. 24, 2026 in corresponding Japanese Patent Application No. 2023-001974, 9 pages (with translation).

* cited by examiner

10 : IMAGE PROCESSING SYSTEM

12

11

13: LIGHT RECEIVER

G1

G2

G4

G5

G6

G7

G11
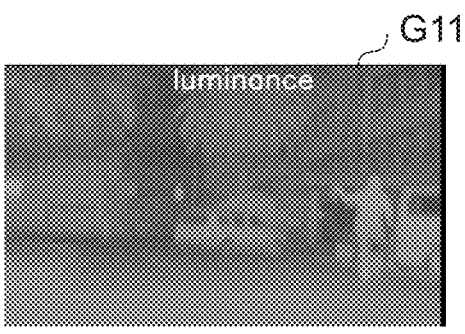
FIG.16A
G12
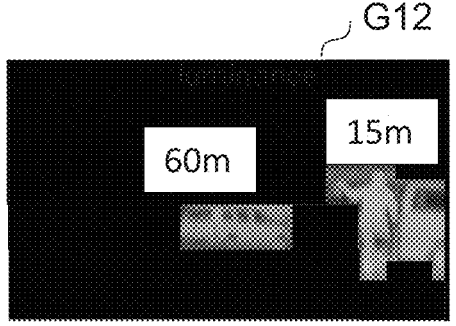
G13
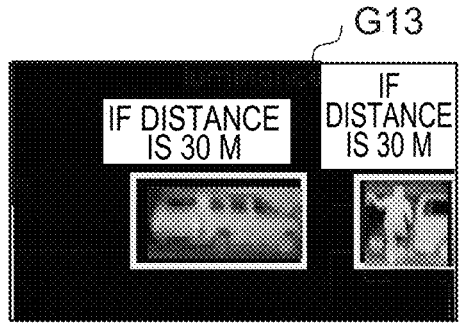
FIG.16B       FIG.16C
G14
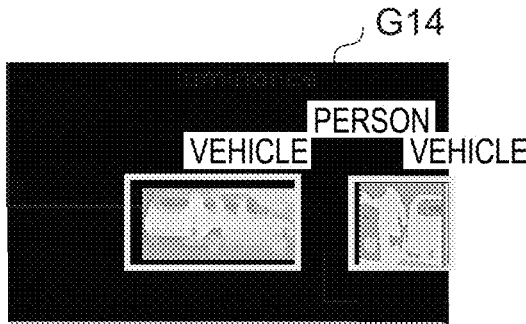
FIG.16D

IMAGE PROCESSING APPARATUS FOR CLASSIFYING THREE-DIMENSIONAL DATA INTO CLUSTERS BASED ON RECOGNIZED OBJECTS AND DISTANCES

CROSS REFERENCE TO RELATED APPLICATIONS

This application is based upon and claims the benefit of priority from the prior Japanese Patent Application No. 2023-001974, filed on Jan. 10, 2023, the entire contents of which are incorporated herein by reference.

FIELD

One or more embodiments of the present invention relate to an apparatus.

BACKGROUND

As the LiDAR (Light Detection & Ranging) technology has been improving, it is expected that the importance of the recognition and classification techniques for three-dimensional data, as well as two-dimensional images, will be increased.

However, at the present stage, it is difficult to efficiently process three-dimensional data as compared to two-dimensional images, since the depth information added to the three-dimensional data increases the calculation amount, thereby complicating the processing, and training data for three-dimensional data is lacking.

BRIEF DESCRIPTION OF THE DRAWINGS

FIGS. 16A to 16D show examples of images generated by the image processing apparatus shown in FIG. 15.

DETAILED DESCRIPTION

Figure 1:
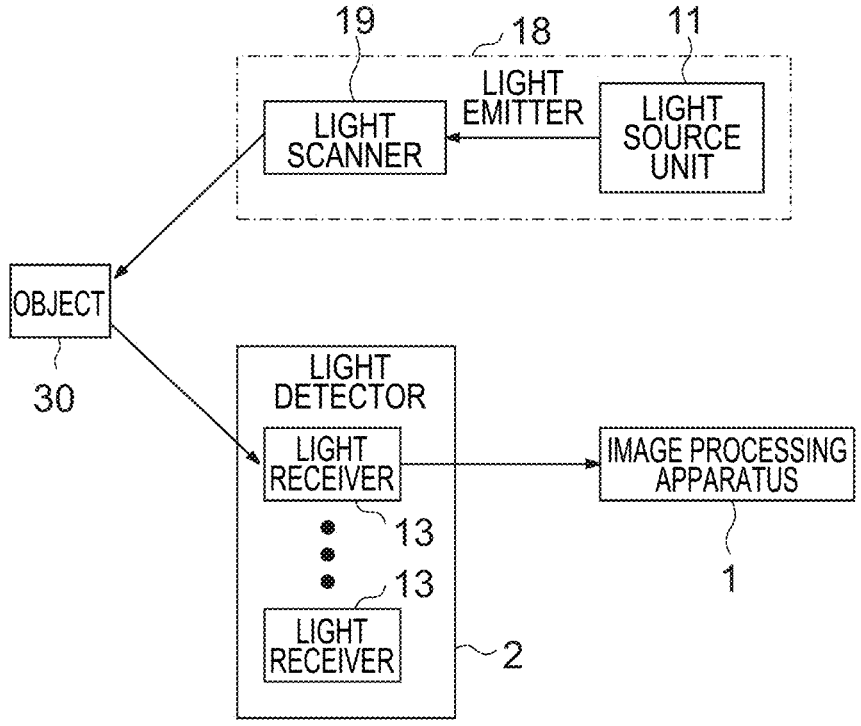
FIG. 1 is a block diagram of an image processing system including an image processing apparatus according to a first embodiment.

According to an embodiment, an image processing apparatus comprising processing circuitry, the processing circuitry is configure to detect light intensity data including at least one of a reflected light intensity of light reflected on an object or an ambient light intensity based on a reception signal corresponding to a reflected light from the object, generate a two-dimensional image based on the light intensity data, recognize the object in the two-dimensional image, generate three-dimensional data by detecting a distance to the object based on the reception signal, and classify the three-dimensional data into one or more clusters based on the recognized object and the distance to the detected object.

Embodiments of an image processing apparatus will now be described below with reference to the accompanying drawings. In the following descriptions, major components of the image processing apparatus will be mainly explained. However, the image processing apparatus may have a component or a function that is not described herein or illustrated in the drawings. The following descriptions do not exclude such a component or function.

First Embodiment

FIG. 1 is a block diagram of an image processing system 10 including an image processing apparatus 1 according to a first embodiment. The image processing system 10 shown in FIG. 1 includes a light emitter 18, a light detector 2, and the image processing apparatus 1.

The light emitter 18 includes a light source unit 11 and a light scanner 19. The light source unit 11 intermittently emits light pulse signals linearly or two-dimensionally.

The light scanner 19 scans the direction of the light pulse signals emitted from the light source unit 11 one dimensionally or two dimensionally. Therefore, it is possible to emit the light pulse signals to an object 30 in a three-dimensional space.

The light detector 2 receives reflected light signals of the light pulse signals emitted to the object 30. The light detector 2 includes a plurality of light receivers 13. The light detector 2 detects reflected light signals that enter a two-dimensional region, for example. A minimum unit in the two-dimensional region of the light detector 2 for receiving the reflected light signals is called "pixel" herein. The light detector 2 includes more than one light receiver 13 configured to receive the reflected light signal in each pixel.

Based on the reflected light signals received by the light detector 2, the image processing apparatus 1 detects the distance to the object 30 and generates a two-dimensional image including luminance information around the object 30 and three-dimensional data including distance information of the object 30.

Figure 2:
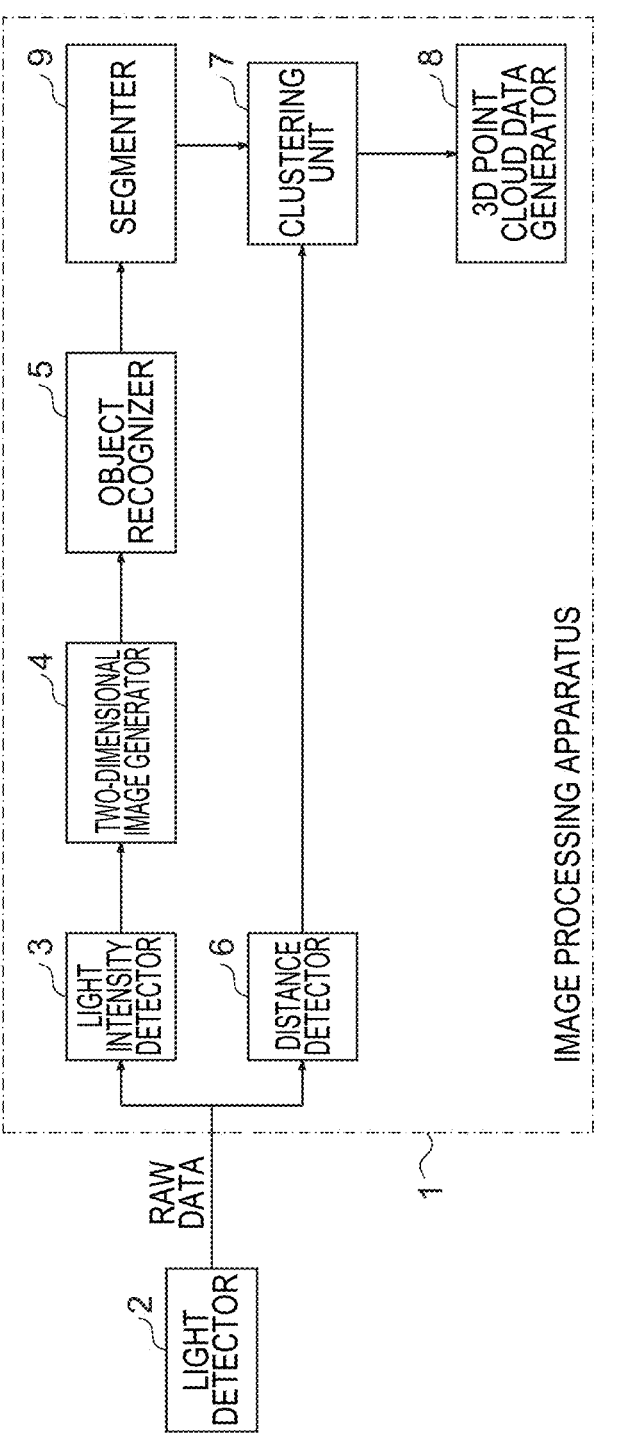
FIG. 2 is a block diagram showing a schematic configuration of an image processing apparatus according to a first embodiment.

FIG. 2 is a block diagram showing a schematic configuration of the image processing apparatus 1 according to the first embodiment. The image processing apparatus 1 includes a light intensity detector 3, a two-dimensional image generator 4, an object recognizer 5, a distance detector 6, a clustering unit 7, a 3D point cloud data generator 8, and a segmenter 9. The information processing apparatus 1 according to the present embodiment may include, for example, processing circuitry. The processing circuitry executes, for example, at least one processing operation of the light intensity detector 3, the two-dimensional image generator 4, the object recognizer 5, the distance detector 6, the clustering unit 7, the 3D point cloud data generator 8, and the segmenter 9 of FIG. 2.

The light detector 2 emits light to an object, and receives reflected light from the object. The light detector 2 may emit light one-dimensionally or two-dimensionally for a scan. The light detector 2 may have a function to change the region to which the light is emitted. The light detector 2 outputs a distance measuring signal including information on the time at which light is emitted, the scan direction, the scan range, the time at which light is received, and the position at which the light is received. The distance measuring signal is sent to the light intensity detector 3 and the distance detector 6. The light detector 2 may be, for example, a LiDAR device. In this case, RAW data outputted from the LiDAR device is inputted to the light intensity detector 3 and the distance detector 6. The RAW data includes the distance measuring signal.

The light intensity detector 3 detects at least one of reflected light intensity or ambient light intensity based on the output signal from the light detector 2. As the distance to the object becomes shorter, the intensity of the reflected light from the object increases. The ambient light intensity is higher in daytime, during which there is a lot of sunlight, than in night time.

The two-dimensional image generator 4 generates a two-dimensional image by assigning a color corresponding to the value of the light intensity detected by the light intensity detector 3 to each pixel.

The object recognizer 5 recognizes an object included in the two-dimensional image. The object is, for example, a moving object. Thus, the object recognizer 5 may recognize the moving object in the two-dimensional image as an object, but does not recognize a motionless object as an object.

The distance detector 6 detects the distance to the object based on the output signal from the light detector 2 to generate three-dimensional data. The three-dimensional data may be three-dimensional point group data in which the locations in space of points, the distances thereto having been measured, are three-dimensionally expressed, or a distance image in which the distances are represented by colors. For example, the distance detector 6 detects the distance to an object based on a time difference between the time at which the light reflected on the object is received and the time at which the light is emitted by the light emitter 1. The distance detector 6 generates three-dimensional data including a cloud of points, the number of which is proportional to the number of times of light emissions from the light emitter 1. In the process of adjusting the direction of light emissions from the light detector 2 one-dimensionally or two-dimensionally, as the number of light emissions increases, the number of point groups included in the three-dimensional data increases, and as the number of light emissions decreases, the number of point groups decreases. If the interval between light emissions is constant, the horizontal or vertical distance between point groups is determined by a distance obtained by cutting the viewing angle of the light detector 2 with a constant angular width. If the angular width of the viewing angle is constant, the number of point groups included in an object increases as the distance to the object becomes shorter, and decreases as the distance becomes longer.

In the three-dimensional data generated by the distance detector 6, the volume of the total point groups of the same object does not change as the distance from the light detector changes, but the density of the point groups becomes higher (the number of point groups included in the object becomes greater) as the distance to the object is shorter, and the density becomes lower (the number of point groups included in the object becomes smaller) as the distance to the object is longer. Each of the point groups in the three-dimensional data corresponds to a different object. Each point in the point group indicates the position at which the object reflects light.

The clustering unit 7 classifies the three-dimensional data into one or more clusters based on the recognition result of the object recognizer 5 and the distance to the object detected by the distance detector 6. The clustering unit 7 may provide a label to an object corresponding to each cluster. The label may help the object be recognized easily.

The image processing apparatus 1 shown in FIG. 2 may or may not include a 3D point cloud data generator 8, which generates data indicating the correspondence relationship among the positions and the distances of point groups and the clusters included in the three-dimensional data. Information on the cluster labels and the types of object corresponding to the point groups may be attached to the data.

The image processing apparatus 1 shown in FIG. 2 may or may not include a segmenter 9. The segmenter 9 classifies the contents of the two-dimensional image into one or more segments based on the object recognized by the object recognizer 5. For example, the segmenter 9 classifies each object (moving object) recognized by the object recognizer 5 into a different segment. The clustering unit 7 classifies the three-dimensional data into more than one cluster corresponding to the more than one segment.

More specifically, the two-dimensional image generator 4 generates the two-dimensional image based on the RAW data detected by the light detector 2. The distance detector 6 also generates the three-dimensional data based on the RAW data detected by the light detector 2. The pixel positions of the two-dimensional image correspond to the pixel positions of the three-dimensional data. Therefore, when the object recognizer 5 recognizes an object at specific pixel positions in the two-dimensional image, the pixel positions of the same object in the three-dimensional data may be easily specified. Similarly, when the segmenter 9 sets a segment at specific pixel positions in the two-dimensional image, pixel positions of the three-dimensional data corresponding to the segment may be easily specified. Thus, the clustering unit 7 may perform the clustering of the three-dimensional data easily according to the segments set by the segmenter 9.

Figure 3:
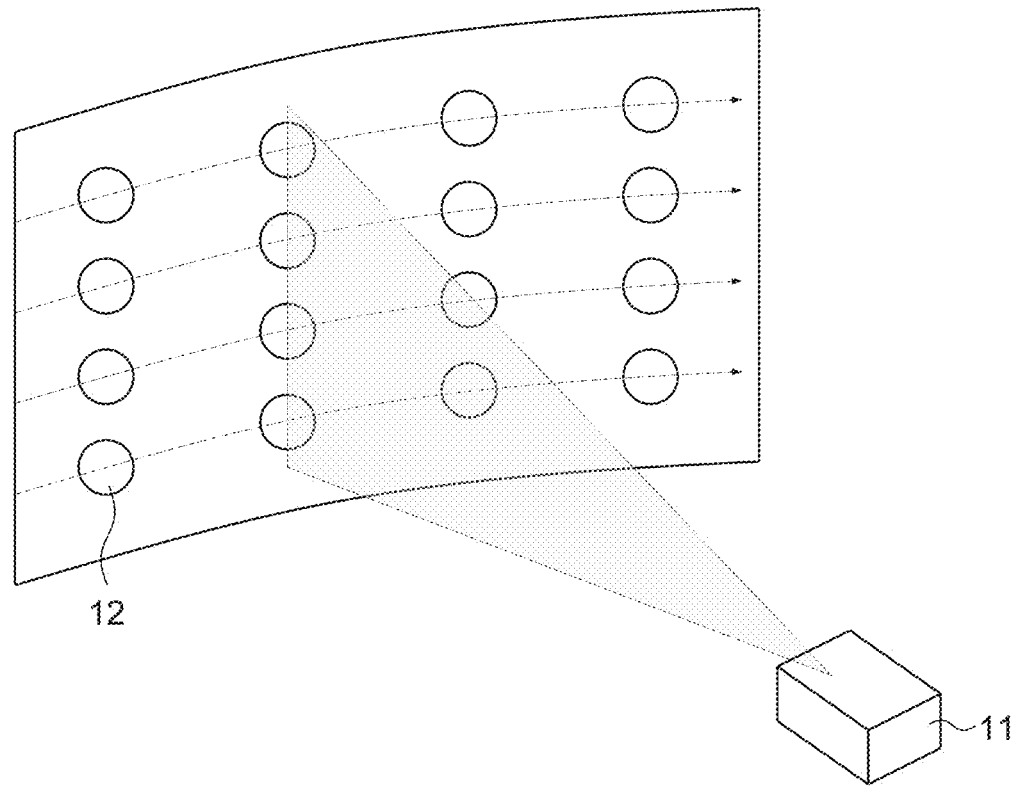
FIG. 3 schematically illustrates how a light detector performs scanning using lights emitted to an object.

FIG. 3 schematically illustrates how the light emitter 18 performs scanning using lights emitted to an object. The light emitter 18 performs the scanning using a plurality of lights simultaneously emitted from a plurality of laser light sources arranged one-dimensionally or two-dimensionally in the light source unit 11. Each circle shown in FIG. 3 schematically represents a beam spot 12 of each laser light.

The laser lights emitted to the object are reflected on the object and received by the light detector 2. The light detector 2 receives the reflected laser lights in the units of pixels. The light detector 2 includes light receivers corresponding to a plurality of pixels.

Figure 4:
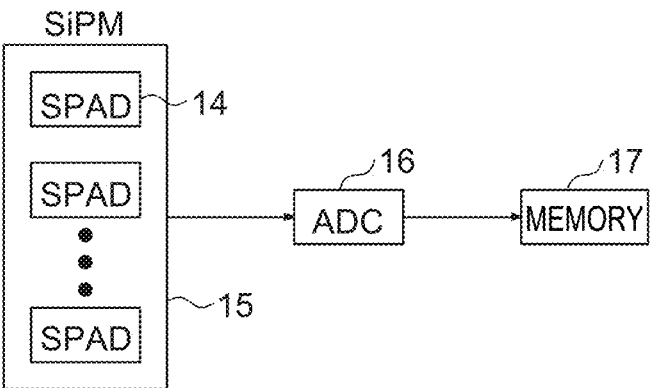
FIG. 4 is a block diagram schematically showing a configuration of a light receiver of the light detector for one pixel.

FIG. 4 is a block diagram schematically showing a configuration of the light receiver 13 of the light detector 2 for one pixel. The light receiver 13 includes a silicon photo-multiplier (SiPM) 15 having a plurality of single photon avalanche diodes (SPADs) 14, an analog digital converter (ADC) 16, and a memory 17.

Each of the SPADs 14 is able to detect light in the unit of one photon. When a photon is detected, the output voltage of the SPAD 14 decreases. Detecting light, the SPAD 14 "fires." The SiPM 15 includes the plurality of SPADs 14, and as the intensity of light received by the light receiver 13 increases, the number of SPADs 14 that fire increases. As a result, the output voltage of the SiPM 15 decreases. Thus, the ADC 16 may be able to output a multi-valued digital signal by analog-to-digital converting the output voltage of the SiPM 15. The digital signal outputted by the ADC 16 may be called "RAW data" herein.

Figure 5:
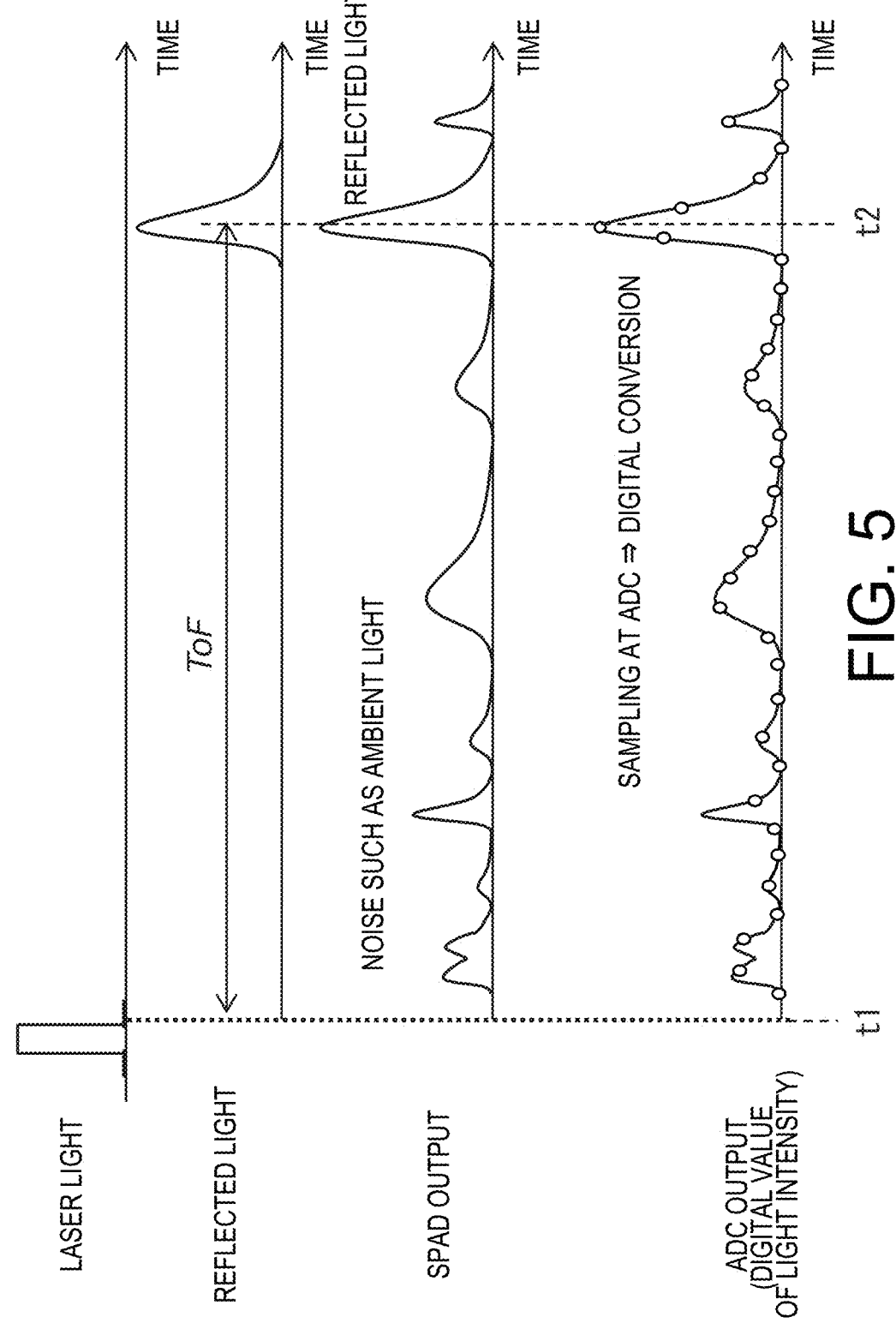
FIG. 5 is a diagram for explaining a method of detecting a distance to an object using a distance detector.

FIG. 5 is a diagram for explaining a method for detecting the distance to an object using the distance detector 6. FIG. 5 shows waveforms of a pulsed light emitted from the light emitter 18, a reflected light from the object, a reflected light received by the light detector 2, and digital signal values (digital values) outputted from the ADC 16. The digital values of the digital signals outputted from the ADC 16 correspond to plot positions in FIG. 5.

The distance detector 6 detects the distance by a time of flight (ToF) method based on the difference in time between t1 at which the laser light is emitted and t2 at which the light detector 2 receives the reflected light.

The SPADs 14 for the same pixel may differ in sensitivity for sensing light caused by, for example, manufacturing inconsistency. Furthermore, since not only the reflected light from the object but also ambient light such as sunlight enters each SPAD 14, the waveform of the reflected light received by each SPAD 14 in the light detector 2 may change as the time lapses. The maximum peak position of the reflected light signal indicates the timing at which the number of SPADs 14 firing in the SiPM 15 is the greatest. It may be understood that at this timing the reflected light from the object is received. The distance detector 6 therefore detects the distance to the object according to the difference in time between the timing at which the light signal is emitted and the timing at which the reflected light signal has the maximum peak.

Figure 6:
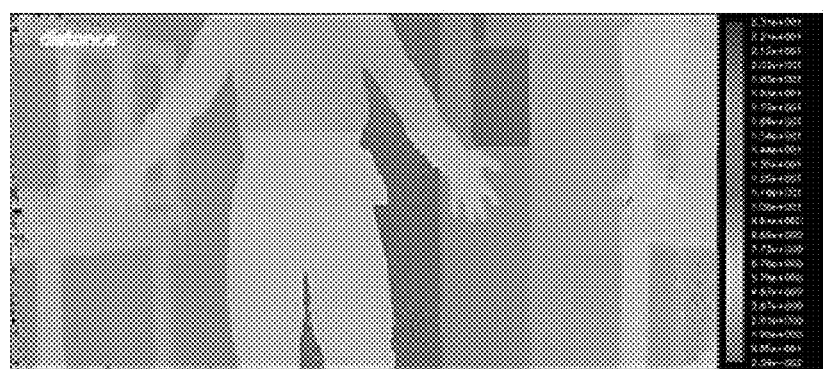
FIG. 6 shows an example of three-dimensional data generated by the distance detector.

The distance detector 6 generates the three-dimensional data based on the detected distance. In the three-dimensional data generated by the distance detector 6, the distance to the object is used as depth information. FIG. 6 shows an example of the three-dimensional data generated by the distance detector 6. The three-dimensional data shown in FIG. 6 is a distance image in which distances are represented by colors. Although the three-dimensional data shown in FIG. 6 is a monochrome image for the sake of convenience, the actual three-dimensional data including the depth information have colors that differ depending on the distance to the object.

Figure 7:
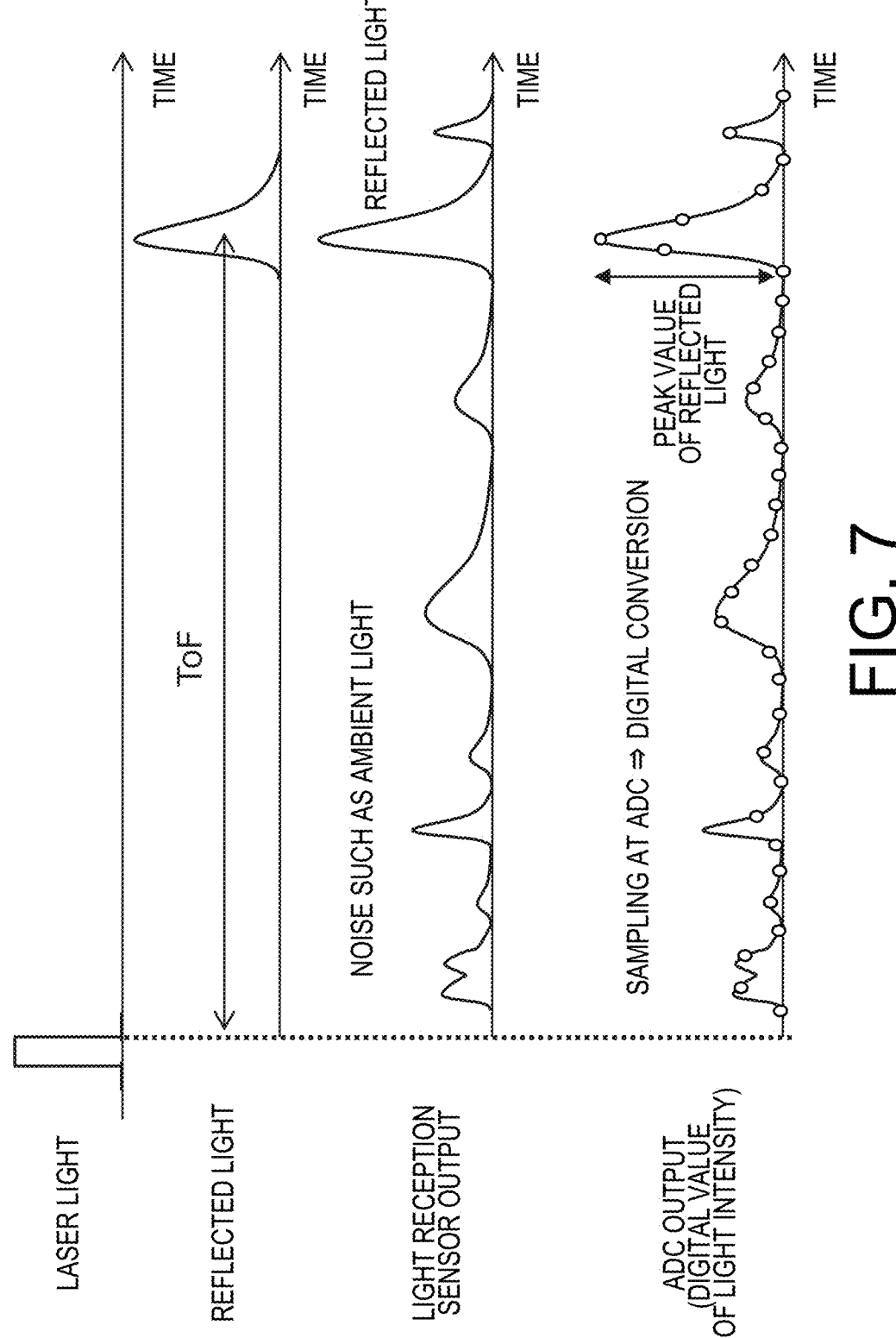
FIG. 7 is a diagram for explaining the detection of reflected light intensity.

The light intensity detector 3 according to the first embodiment is able to detect the reflected light intensity based on the output signal from the light detector 2. FIG. 7 is a diagram for explaining the detection of the reflected light intensity. Like FIG. 5, FIG. 7 shows waveforms of a pulsed light emitted from the light emitter 18, a reflected light from the object, a reflected light received by the light detector 2, and digital signal values (digital values) outputted from the ADC 16. The light detector 2 detects a peak value of the digital signal outputted from the ADC 16 as the reflected light intensity.

As described above, the light intensity detector 3 detects the reflected light intensity of each pixel based on the timing at which the number of SPADs 14 that have detected light is the greatest. In this case, the two-dimensional image generator 4 generates the two-dimensional image based on the reflected light intensity of each pixel detected by the light intensity detector 3.

Figure 8:
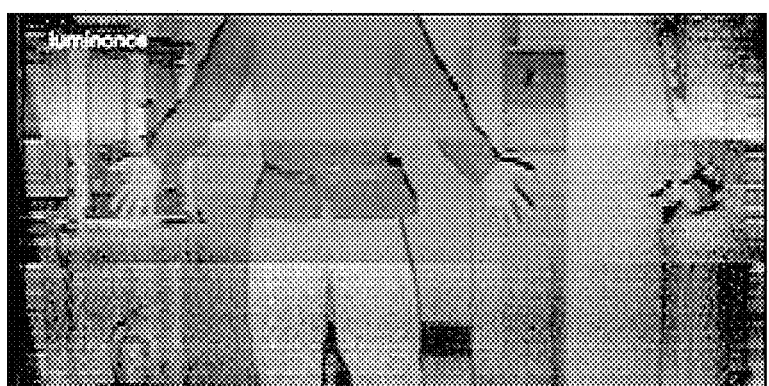
FIG. 8 shows an example of two-dimensional image generated based on the reflected light intensity.

FIG. 8 shows an example of the two-dimensional image generated based on the reflected light intensity. As shown in FIG. 8, the generated two-dimensional image has luminance that corresponds to the reflected light intensity.

Figure 9:
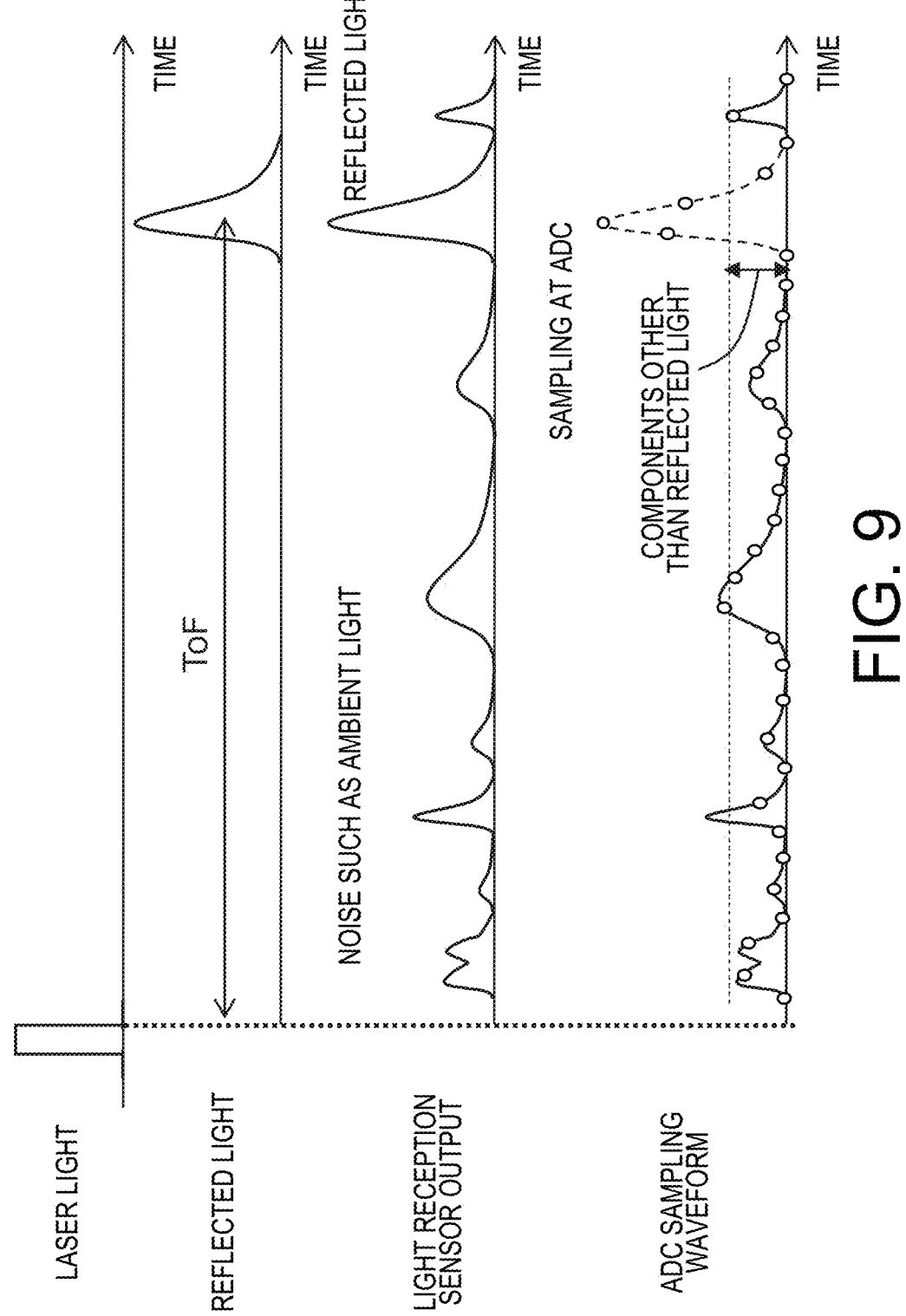
FIG. 9 is a diagram for explaining the detection of ambient light intensity.

The light intensity detector 3 according to the first embodiment is also able to detect the ambient light intensity based on the output signal of the light detector 2. FIG. 9 is a diagram for explaining the detection of the ambient light intensity. FIG. 9 shows waveforms of a pulsed light emitted from the light emitter 18, a reflected light from the object, a reflected light received by the light detector 2, and digital signal values (digital values) outputted from the ADC 16.

The ambient light means lights received by the light detector 2 other than the reflected light from the object. The main component of the ambient light is sunlight. Since it is likely that the light intensity of the ambient light is smaller than that of the reflected light from the object, the digital signal outputted from the ADC 16 around the peak value is removed from FIG. 9 (the removed portion is indicated by a broken line in FIG. 9). The light intensity detector 3 detects the ambient light intensity based on the remaining portions of the digital signal outputted from the ADC 16.

The light intensity detector 3 may detect the ambient light intensity of each pixel except for the timing at which the number of SPADs 14 that are detecting light is the greatest. In this case, the two-dimensional image generator 4 generates the two-dimensional image based on the ambient light intensity detected for each pixel by the light intensity detector 3.

Figure 10:
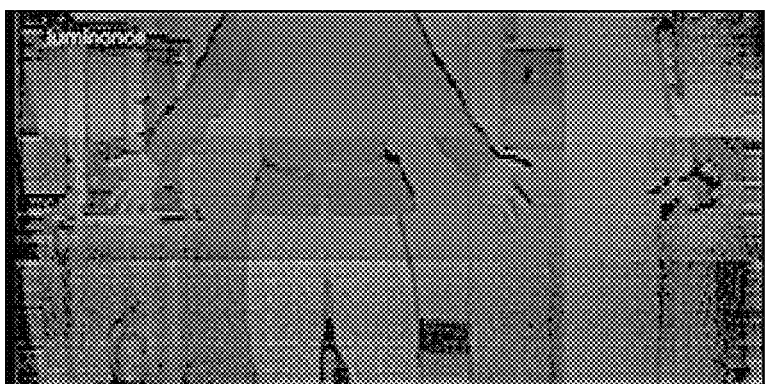
FIG. 10 shows an example of two-dimensional image generated based on the ambient light intensity.

FIG. 10 shows an example of the two-dimensional image generated based on the ambient light intensity. As may be understood from FIG. 9, since information on the pixels in which the reflected light intensity is high is excluded in FIG. 10, it may be rather difficult to view the moving object in the two-dimensional image, but it may be easier to view information in the background. During the daytime in summer under a blazing sun, in which the ambient light intensity should be very high, it is more difficult to detect the reflected light intensity. Therefore, it is easier to recognize an object using the ambient light intensity. On the other hand, during the nighttime, in which the ambient light intensity becomes extremely low, it would be difficult to detect the ambient light intensity. Therefore, it may be easier to recognize an object using the reflected light intensity. Thus, either of the two types of light intensity, which is suitable for the environment, may be used for generating the two-dimensional image.

Figure 11A:
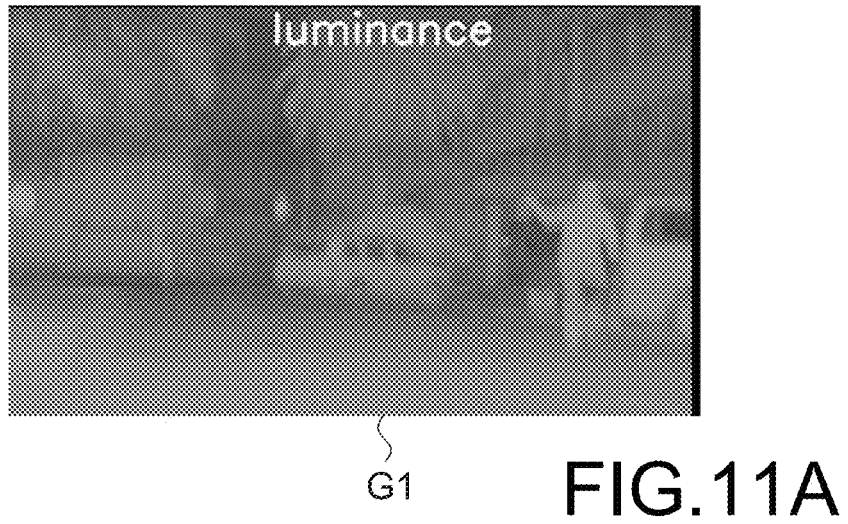
FIGS. 11A and 11B show examples of two-dimensional image and three-dimensional data generated by the image processing apparatus
Figure 11B:
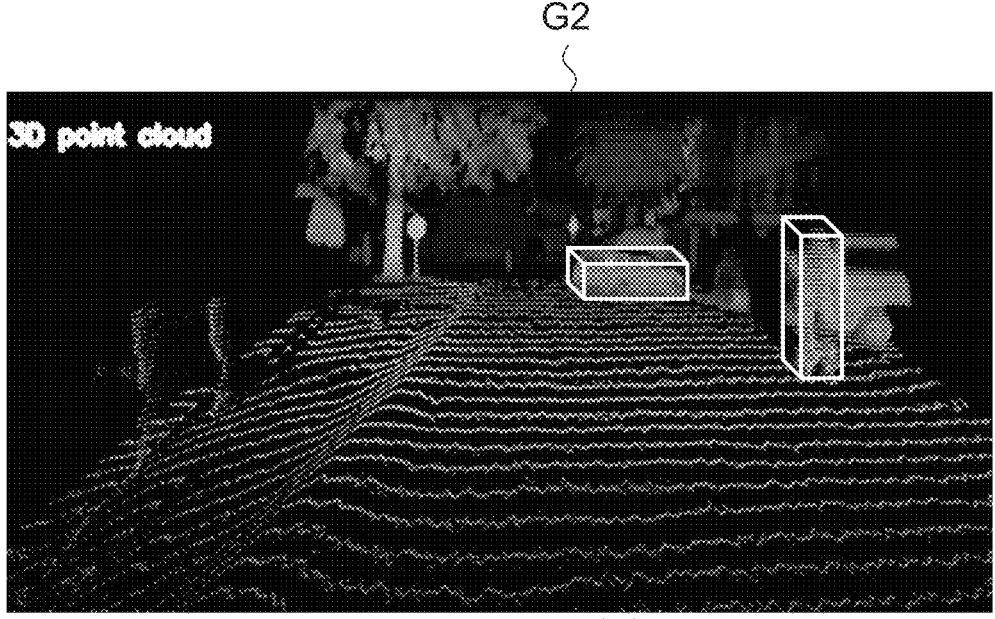

FIGS. 11A and 11B show examples of two-dimensional image and three-dimensional data generated by the image processing apparatus 1 shown in FIG. 1. FIG. 11A shows an example of a two-dimensional image G1 generated by the two-dimensional image generator 4 based on the reflected light intensity detected by the light intensity detector 3. The object recognizer 5 recognizes one or more objects (for example, moving objects) included in the two-dimensional image G1 by using a pattern matching method, for example. FIG. 11B shows an example in which the clustering unit 7 has performed clustering to classify respective objects in the three-dimensional data G2 into different clusters, the objects including those recognized by the object recognizer 5. In FIG. 11B, frames are added to two objects (for example, moving objects) included in the three-dimensional data G2, the respective frames indicating different clusters.

As described above, in the first embodiment, the two-dimensional image data and the three-dimensional data are generated based on the RAW data outputted from the light detector 2, the object is recognized based on the two-dimensional image data, and the clustering is performed on the three-dimensional data based on the recognition result. The clustering of the three-dimensional data in this manner may be easier, faster, and more accurate than the clustering of the three-dimensional data performed by directly recognizing the object in the three-dimensional data. After the clustering of the three-dimensional data is performed, the moving object may be tracked or recognized, for example.

Second Embodiment

An image processing apparatus 1a according to a second embodiment has a function to adjust the contrast of the two-dimensional image.

Figure 12:
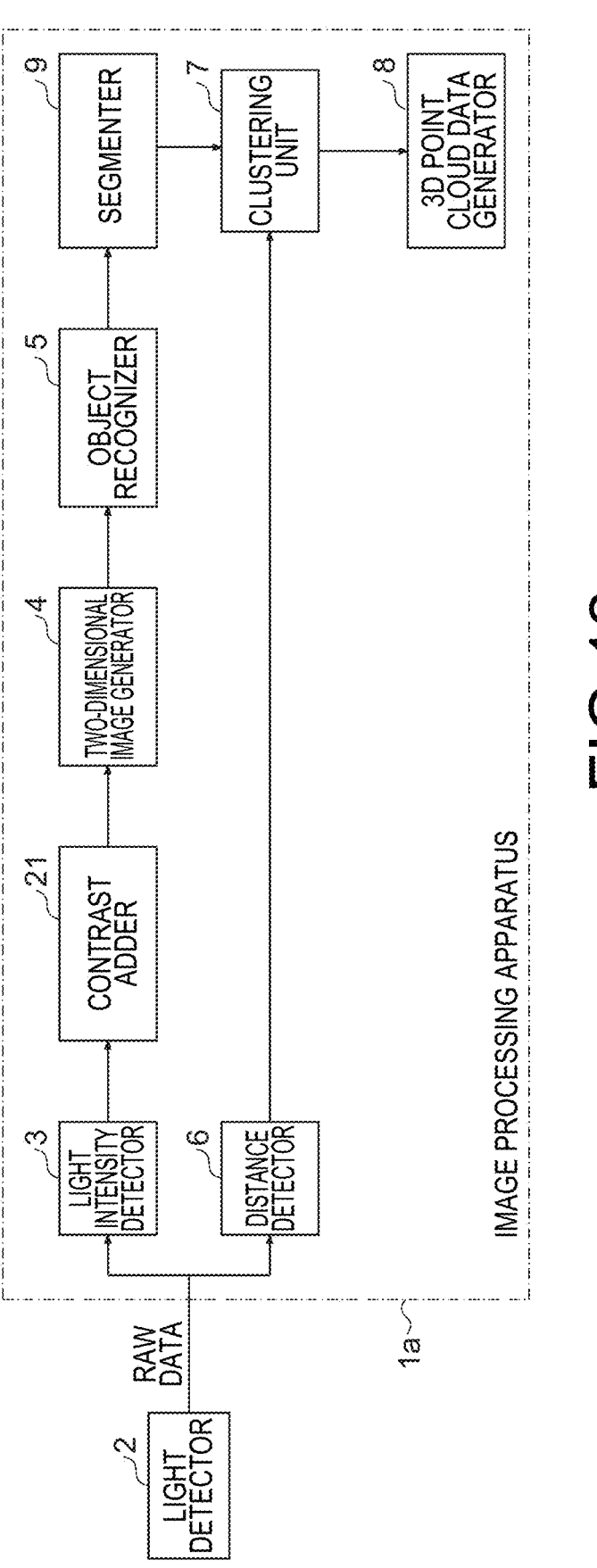
FIG. 12 is a block diagram showing a schematic configuration of an image processing apparatus according to a second embodiment.

FIG. 12 is a block diagram showing a schematic configuration of the image processing apparatus 1a according to the second embodiment. In FIG. 12, elements that are common to those in FIG. 2 have the same reference numerals. In the following descriptions, differences between the first and the second embodiment will be mainly described.

The image processing apparatus 1a shown in FIG. 12 includes a contrast adder 21 in addition to the elements in the block diagram of the image processing apparatus 1 in FIG. 2. The contrast adder 21 adds contrast information to the light intensity data detected by the light intensity detector 3. The two-dimensional image generator 4 generates the two-dimensional image based on the light intensity data to which the contrast information is added. For example, the contrast adder adds the contrast information to the light intensity data so as to emphasize the contrast between the object (moving object) and the surroundings in the two-dimensional image. The contrast information is used to instruct how the contrast is emphasized in the pixel region of the object (moving object). By providing the contrast adder 21, it is possible to show the object (moving object) in the two-dimensional image in white, and to show the background portion around the object (moving object) in black, so as to help the object recognizer 5 recognize the object (moving object) more easily.

Figure 13:
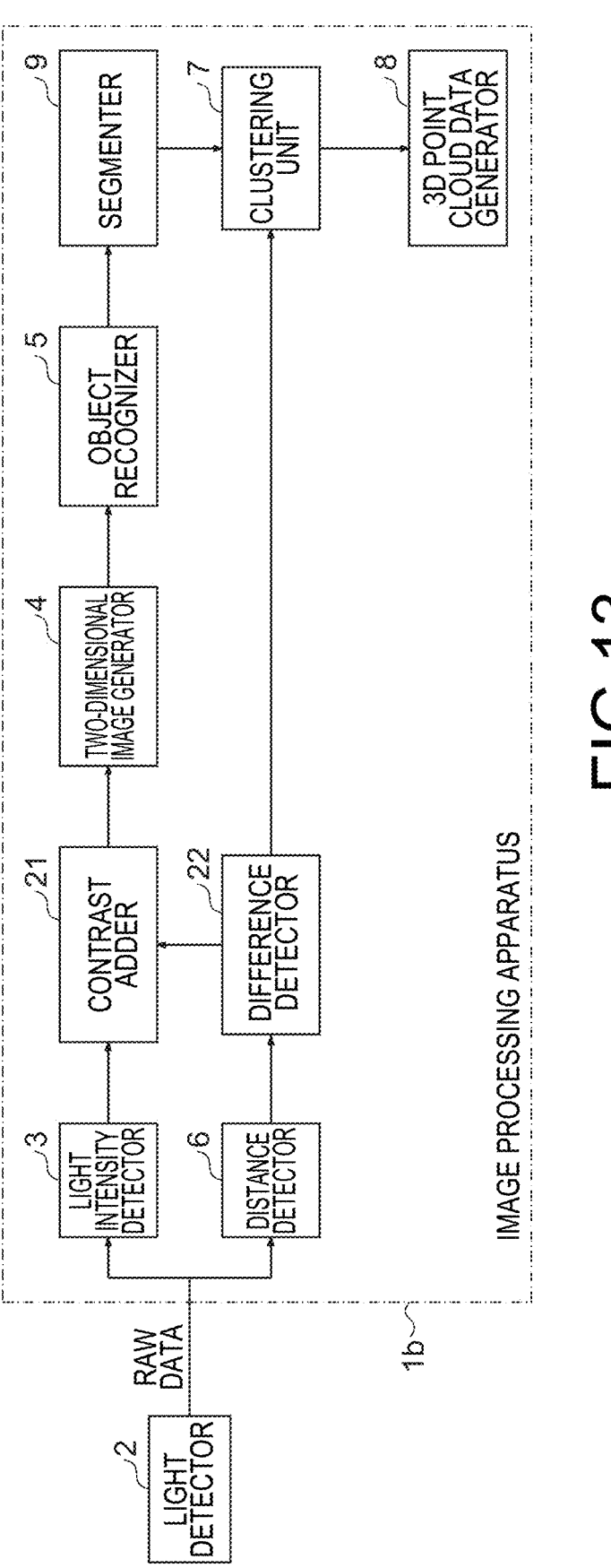
FIG. 13 is a block diagram showing a schematic configuration of an image processing apparatus according to a first modification of the first embodiment.

FIG. 13 is a block diagram showing a schematic configuration of an image processing apparatus 1b according to a first modification of the second embodiment. In FIG. 13, elements common to those in FIG. 12 have the same reference numerals. In the following descriptions, differences will be mainly described.

The image processing apparatus 1b shown in FIG. 13 includes a difference detector 22. The difference detector 22 detects a moving object by obtaining a difference between a plurality of three-dimensional data sets generated at different points in time. For example, the difference detector 22 easily detects only a point group of the moving object by obtaining a difference between two three-dimensional data sets generated at different points in time.

By providing the difference detector 22, it is possible to extract only the point group of the moving object from the three-dimensional data detected by the distance detector 6 to generate new three-dimensional data, thereby reducing the data amount of the three-dimensional data. As a result, the load of the clustering performed by the clustering unit 7 in a later stage may be reduced.

The contrast adder 21 adds the contrast information to the light intensity data so as to emphasize the presence of the moving object in the two-dimensional image detected by the difference detector 22. As a result, the two-dimensional image generator 4 may be able to emphasize the contrast of the pixel region in the moving object included in the two-dimensional image.

Figure 14A:
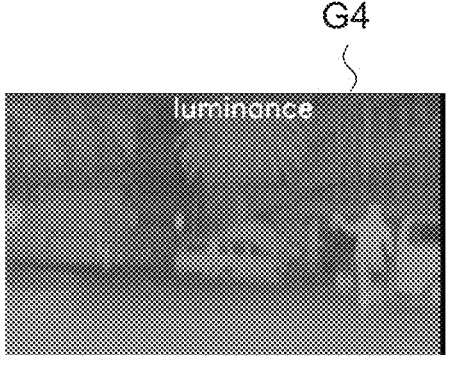
FIGS. 14A to 14D show examples of image generated by the image processing apparatus shown in FIG. 12.
Figure 14B:
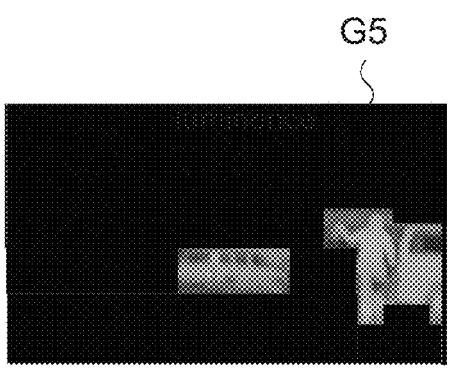
Figure 14C:
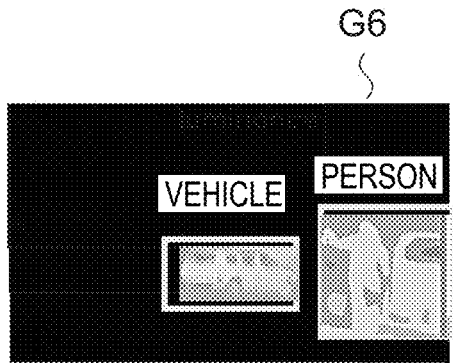
Figure 14D:
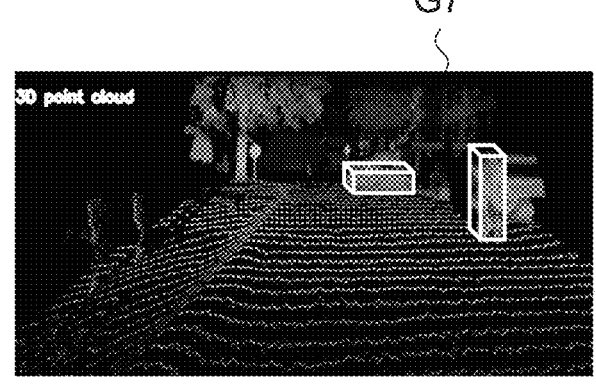

FIGS. 14A to 14D show examples of image generated by the image processing apparatus 1a illustrated in FIG. 12. FIG. 14A shows a two-dimensional image G4 generated before the contrast adder 21 adds the contrast information to the light intensity data. FIG. 14B shows a two-dimensional image G5 in which the contrast around the moving object is emphasized by the contrast adder 21. FIG. 14C shows a two-dimensional image G6 obtained after the two-dimensional image G5 is divided into segments. FIG. 14D shows a three-dimensional data G7 obtained after clustering is performed.

The difference detector 22 detects the moving object included in the three-dimensional data by detecting a difference between a plurality of three-dimensional data sets detected by the distance detector 6. The contrast adder 21 adds the contrast information to the light intensity data so as to emphasize the contrast between the moving object detected by the difference detector 22 and the background. The two-dimensional image generator 4 therefore generates the two-dimensional image G5 in which the moving object is emphasized as shown in FIG. 14B. The two-dimensional image G5 is blacked out except for the pixel regions including moving objects.

The contrast information added by the contrast adder 21 includes, for example, information instructing that the luminance of pixels around high-luminance pixels (such as white-based pixels) in a pixel region including a moving object should be reduced so that the they have a dark color (black-based color), and that the luminance of pixels around low-luminance pixels (such as black-based pixels) in the two-dimensional image should be increased so that the pixels have a light color (white-based color). Receiving the contrast information, the two-dimensional image generator 4 generates the two-dimensional image G5, for example. The object recognizer 5 recognizes the moving object from the two-dimensional image G5 in which the contrast between the moving object and the surrounding portions is emphasized. The segmenter 9 put each moving object recognized by object recognizer 5 into a segment. The two-dimensional image G6 shown in FIG. 14C has two segments. The contrast is more emphasized in the two-dimensional image G6 than in the two-dimensional image G5. The clustering unit performs clustering on the three-dimensional data so as to be associated with the pixel positions in each segment of the two-dimensional image G5. The three-dimensional data G7 shown in FIG. 14D has two clusters corresponding to the two segments in the two-dimensional image G6 shown in FIG. 14C.

As described above, as the contrast between an object and surrounding regions in the two-dimensional image is emphasized in the second embodiment, the accuracy in recognition of the object may be improved. Furthermore, by providing the difference detector 22, it is possible to detect the moving object in the three-dimensional data easily. The contrast adder 21 uses the detection result of the difference detector 22 to emphasize the contrast between the moving object and the surrounding regions in the two-dimensional image. Therefore, the object recognizer 5 may be able to recognize the moving object included in the two-dimensional image with high accuracy, and the clustering unit 7 may be able to perform the clustering of each moving object in the three-dimensional data with high accuracy.

Third Embodiment

The distance to each object included in a two-dimensional image is not always the same. In the two-dimensional image, an object that is closer is displayed bigger, and an object that is more distant is displayed smaller. Therefore, there is a possibility that an object that is distantly located may not be correctly recognized from the two-dimensional image. On the other hand, in three-dimensional data, each object is expressed as a point group having the same contour size regardless of the distance to the object, but the density of each point group differs depending on the distance. Therefore, a third embodiment is intended to recognize each object in a two-dimensional image with high accuracy regardless of the distance to the object.

Figure 15:
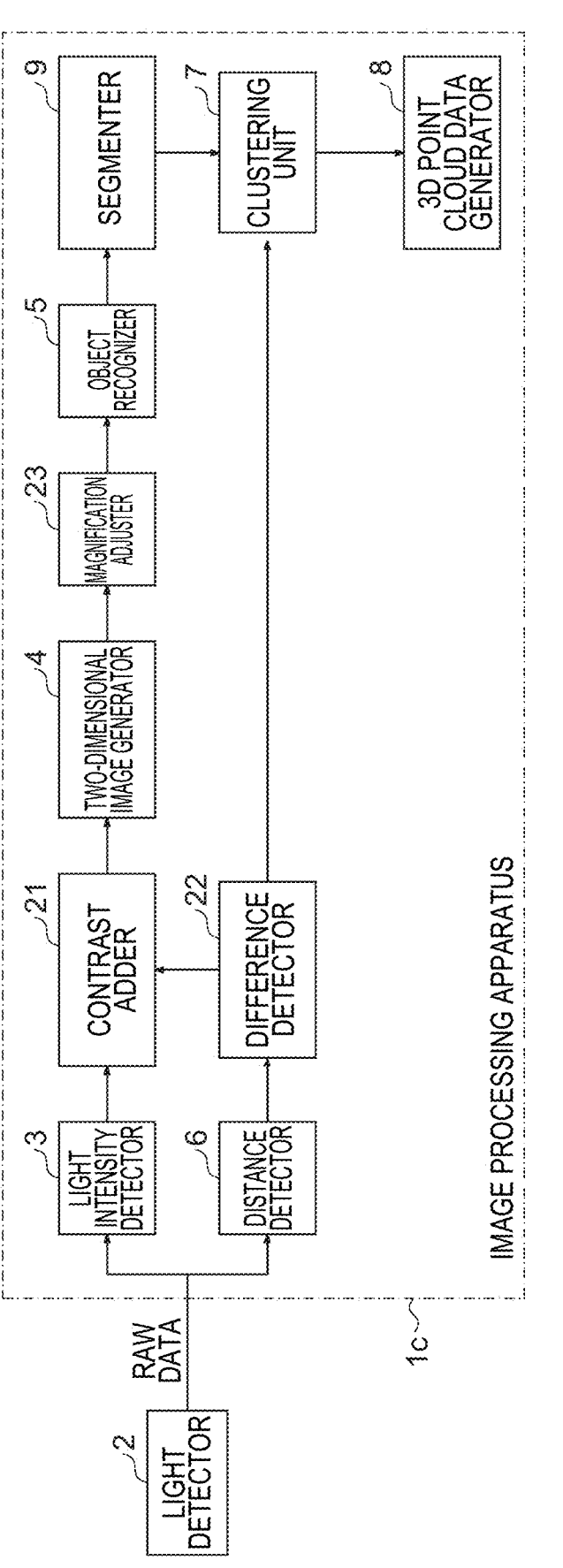
FIG. 15 is a block diagram showing a schematic configuration of an image processing apparatus according to a third embodiment.

FIG. 15 is a block diagram showing a schematic configuration of an image processing apparatus 1c according to the third embodiment. In FIG. 15, elements common to those in FIG. 13 have the same reference numerals. In the following descriptions, differences will be mainly described.

In addition to the configuration shown in FIG. 13, the image processing apparatus 1c shown in FIG. 15 includes a magnification adjuster 23. Based on moving objects detected by the difference detector 22 and the distances to the moving objects detected by the distance detector 6, the magnification adjuster 23 adjust the sizes of the moving objects in the two-dimensional image, which locate at the same distance. In other words, the magnification adjuster 23 adjusts the sizes of moving objects in the two-dimensional image, the distances to the moving objects differing from each other, to sizes determined on the assumption that the distances to them are the same. This makes it easier to recognize an object located in the distance.

The magnification adjuster 23 adjusts the sizes of objects to sizes that are obtained by assuming that the objects are at the same distance based on the sizes of the objects in the two-dimensional image and the distances to the objects detected by the distance detector 6. For example, if the distance to an object is 100 m and the distance to another object is 1 m, the magnification adjuster 23 may adjust the sizes of the objects to sizes obtained by assuming that the distance to both of the objects is 10 m.

The object recognizer 5 recognizes the objects based on the two-dimensional image including the objects of which the sizes have been adjusted by the magnification adjuster 23.

If a new two-dimensional image is generated, in which the size of each object has been adjusted by the magnification adjuster 23, the pixel positions in the new two-dimensional image do not conform to the pixel positions in the three-dimensional data generated by the distance detector 6. Therefore, the two-dimensional image before being subjected to the adjustment of the size of each object by the magnification adjuster 23 should be used for the operations performed by the segmenter 9 and the clustering unit 7. Thus, the clustering unit 7 performs the clustering of the moving objects included in the three-dimensional data based on the moving objects recognized by the object recognizer 5 and the two-dimensional image before being subjected to the adjustment performed by the magnification adjuster 23.

FIGS. 16A to 16D show examples of images generated by the image processing apparatus 1c shown in FIG. 15. FIG. 16A shows a two-dimensional image G11 before being subjected to contrast adjustment. FIG. 16B shows a two-dimensional image G12 in which the contrast between two moving objects and the surrounding regions is emphasized, the two objects being located at different distances (60 m and 15 m) and detected by the difference detector 22. The two-dimensional image G12 includes a moving object (vehicle), the distance thereto being 60 m, and a moving object (person), the distance thereto being 15 m. FIG. 16C shows a two-dimensional image G13 after being subjected to magnification adjustment performed by the magnification adjuster 23. For example, the magnification adjuster 23 adjusts the sizes of the two moving objects included in the two-dimensional image G12 by assuming that the distance to the two moving objects is 30 m, for example, and generates the two-dimensional image G13 including the adjusted moving objects. The moving objects in the two-dimensional image G13 have sizes that are determined by assuming that they are at the same distance. This makes it easier for the object recognizer 5 to recognize the moving objects. FIG. 16D shows a two-dimensional image G14 in which the moving objects are classified into different segments by the segmenter 9 based on the recognition result of the object recognizer 5. With the two-dimensional image G14, the clustering operation may be performed with high accuracy on the three-dimensional data by the clustering unit 7.

As described above, in the third embodiment, the sizes of objects (moving objects) included in a two-dimensional image are adjusted by the magnification adjuster 23 so that the object recognizer 5 may accurately recognize the objects (moving objects) even if the distances to the objects are different. This improves the recognition accuracy of the object recognizer 5.

Fourth Embodiment

The three-dimensional data generated based on the distances to the moving objects detected by the detector 6 also includes point groups of various objects other than those of the moving objects. In order to efficiently extract only the point groups of the moving objects included in the three-dimensional data, it is preferable that a function be provided to delete point groups other than those of the moving objects as noise.

Figure 17:
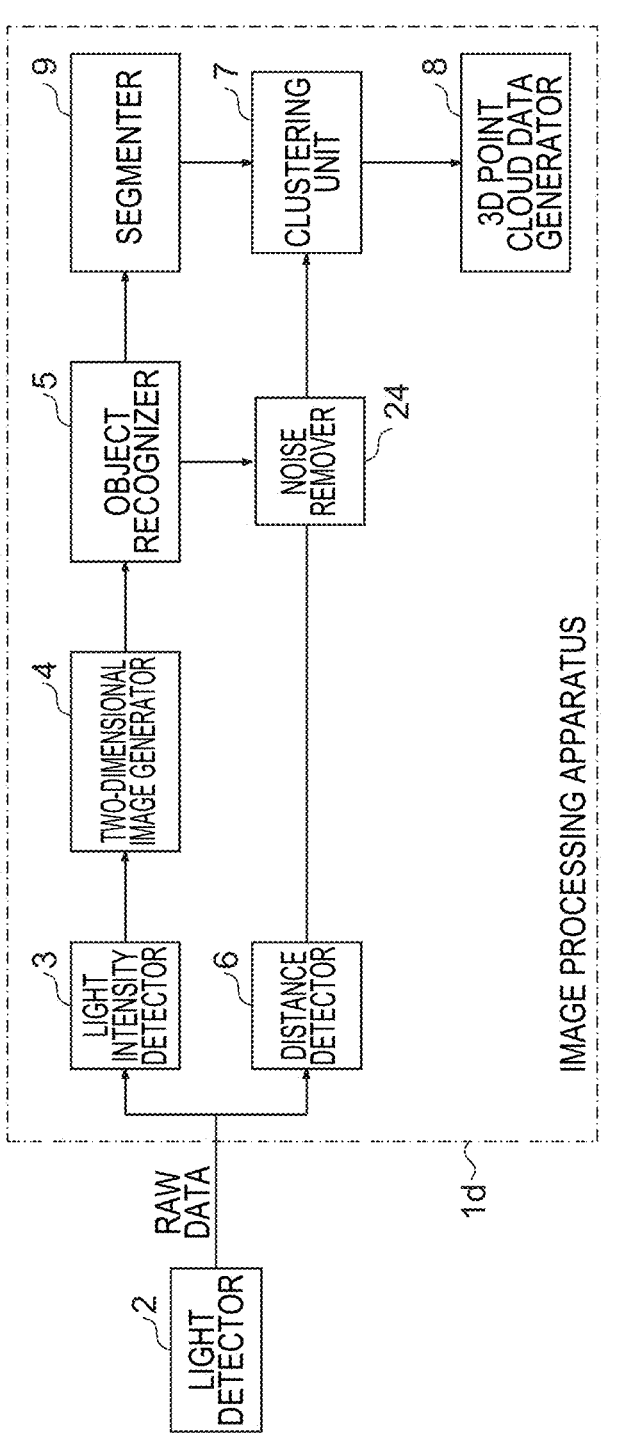
FIG. 17 is a block diagram showing a schematic configuration of an image processing apparatus according to a fourth embodiment.

FIG. 17 is a block diagram showing a schematic configuration of an image processing apparatus 1d according to a fourth embodiment. In FIG. 17, elements common to those of FIG. 2 have the same reference numerals. In the following descriptions, differences will be mainly described.

In addition to the configuration shown in FIG. 1, the image processing apparatus 1d shown in FIG. 17 includes a noise remover 24. The noise remover 24 removes noise included in the three-dimensional data generated based on the distances detected by the distance detector 6. The removal of noise from the three-dimensional data is performed by the noise remover 24 based on the objects recognized by the object recognizer 5, for example. The noise remover 24 has data of contour sizes of point groups (such as vehicle or person) associated with the recognition results of the object recognizer 5, and compare the data with the point groups of the objects in the three-dimensional data. The noise remover 24 removes as noise point groups that are not in the data.

The clustering unit 7 performs the clustering operation on each object included in the three-dimensional data from which noise has been removed by the noise remover 24.

Figure 18:
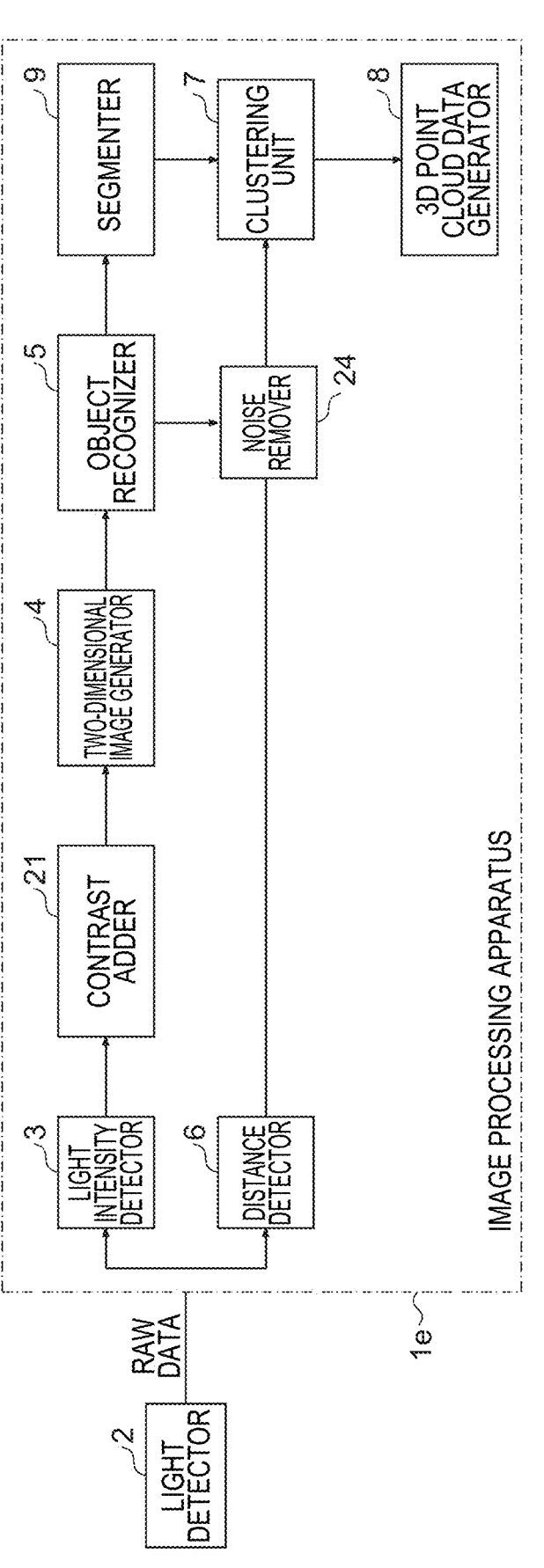
FIG. 18 is a block diagram showing a schematic configuration of an image processing apparatus according to a modification of FIG. 17.

FIG. 18 is a block diagram showing a schematic configuration of an image processing apparatus 1e according to a modification of the image processing apparatus 1d shown in FIG. 17. In addition to the configuration shown in FIG. 12, the image processing apparatus 1e shown in FIG. 18 includes a noise remover 24. The noise remover 24 may also be added to the image processing apparatus 1b shown in FIG. 13 or the image processing apparatus 1c shown in FIG. 15.

As described above, the removal of noise included in the three-dimensional data based on the object recognized by the object recognizer 5 makes it easy for the clustering unit 7 to perform the clustering operation.

Fifth Embodiment

In the first to fourth embodiments described above, the object recognizer 5 recognizes objects in the entire regions of the two-dimensional image. However, a region of interest (ROI) may be set in a part of the two-dimensional image and objects may be recognized in the ROI.

Figure 19:
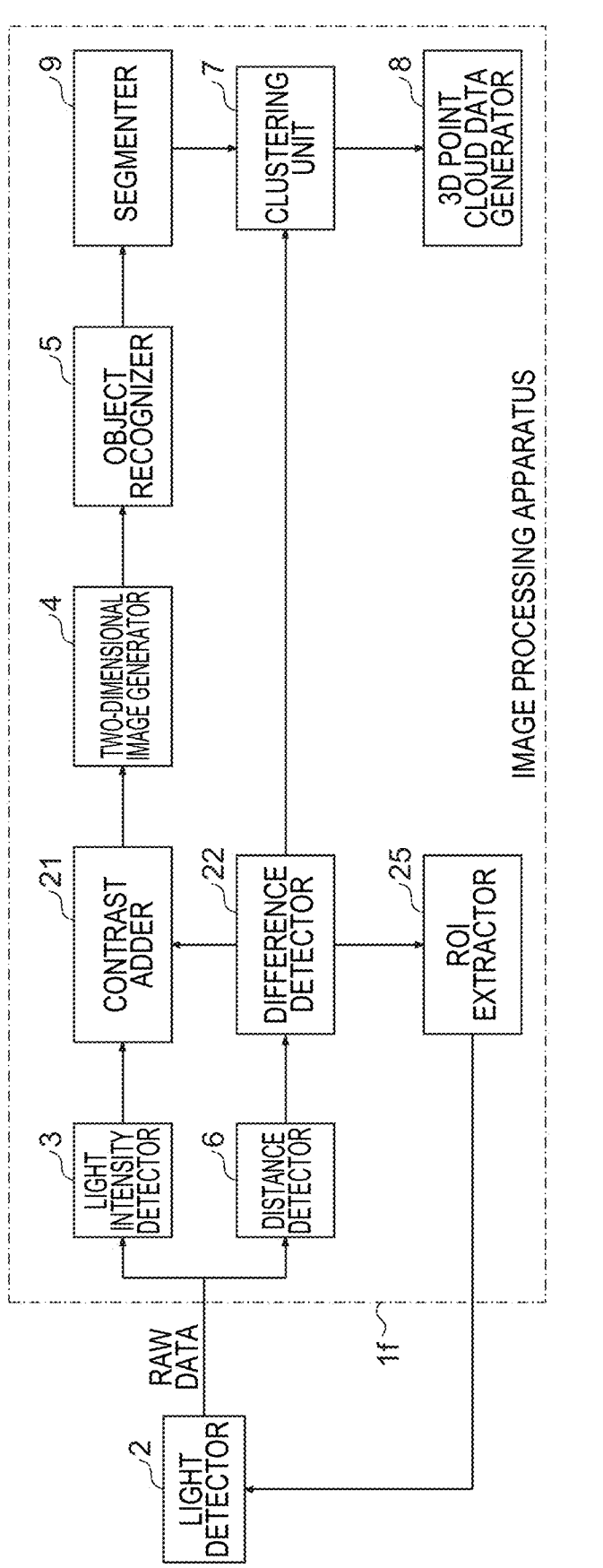
FIG. 19 is a block diagram showing a schematic configuration of an image processing apparatus according to a fifth embodiment.

FIG. 19 is a block diagram showing a schematic configuration of an image processing apparatus 1f according to a fifth embodiment. In FIG. 19, elements common to FIG. 2 have the same reference numerals. In the following descriptions, differences will be mainly described.

In addition to the configuration shown in FIG. 13, the image processing apparatus 1f shown in FIG. 19 includes an ROI extractor 25. The ROI extractor 25 extracts a pixel region including the moving object detected by the difference detector 22 in the two-dimensional image as an ROI.

The light emitter 18 controls the scanning region of the light emitted to the object based on the ROI detected by the ROI extractor 25. In other words, the light emitter 18 concentratedly emits light to the ROI to receive the reflected light from the object in the ROI. As a result, the distance to the object in the ROI may be detected more accurately, and therefore the shape and the size of the object may be obtained in more detail.

The contrast adder 21 adds contrast information to the light intensity data so that the contrast between the moving object and the surrounding regions in the two-dimensional image corresponding to the ROI may be emphasized. For example, the contrast adder 21 adds contrast information to the light intensity data for changing the color of the pixel regions other than the pixel region corresponding to the ROI to be a monotone color (for example, black).

After the light detector 2 controls the scanning region of the light emitted to the object based on the ROI extracted by the ROI extractor 25, the two-dimensional image generator 4 generates a two-dimensional image corresponding to the ROI based on the reflected light received by the light detector 2. Therefore, the two-dimensional image generated by the two-dimensional image generator 4 may have a detailed image in the ROI. Furthermore, in the two-dimensional image generated by the two-dimensional image generator 4, the contrast between the object (moving object) and the surrounding regions is emphasized based on the contrast information added by the contrast adder 21.

The object recognizer 5 recognizes the object in the ROI in the two-dimensional image. As a result, the object may be recognized rapidly and accurately.

Although the configuration in FIG. 19 is obtained by adding the ROI extractor 25 to the configuration of FIG. 13, the ROI extractor 25 may be added to the configuration shown in FIG. 15. By adjusting the magnification of the object (moving object) included in the two-dimensional image of the ROI, for example, the magnification may be performed more accurately, and the recognition accuracy of the object recognizer 5 may be improved. The noise remover 24 shown in FIG. 17 may further be added.

As described above, in the fifth embodiment, a region including the moving object detected by the difference detector 22 is extracted as an ROI, and the light from the light emitter 18 is concentratedly emitted to the ROI to detect the shape and the size of the moving object in the ROI more accurately. The emission of light to a limited region in which the moving object is present enables the clustering of the three-dimensional data to be performed more efficiently.

The above-described embodiments may be configured as follows.

[1]

An image processing apparatus includes:
    a light intensity detector configured to detect light intensity data including at least one of a reflected light intensity of light reflected on an object or an ambient light intensity based on a reception signal corresponding to a reflected light from the object;
    a two-dimensional image generator configured to generate a two-dimensional image based on the light intensity data;
    an object recognizer configured to recognize the object in the two-dimensional image;
    a distance detector configured to generate three-dimensional data by detecting a distance to the object based on the reception signal; and
    a clustering unit configured to classify the three-dimensional data into one or more clusters based on a recognition result of the object recognizer and the distance to the object detected by the distance detector.

[2]

The image processing apparatus according to [1], further including a segmenter configured to classify the two-dimensional image into one or more segments based on the object recognized by the object recognizer,
    wherein the clustering unit classifies the three-dimensional data into the one or more clusters so as to correspond to the one or more segments.

[3]

The image processing apparatus according to [2], wherein the segmenter classifies each object recognized by the object recognizer into a different segment.

[4]

The image processing apparatus according to any one of [1] to [3], further including a contrast adder configured to add contrast information to the light intensity data detected by the light intensity detector based on the three-dimensional data,
    wherein the two-dimensional image generator generates the two-dimensional image based on the light intensity data to which the contrast information has been added.

[5]

The image processing apparatus according to [4], wherein the contrast adder adds the contrast information to the light intensity data so that the contrast between the object and surrounding regions in the two-dimensional image is emphasized.

[6]

The image processing apparatus according to [5], further including a difference detector configured to detect a moving object based on a difference among a plurality of sets of the three-dimensional data generated at different points in time, wherein the contrast adder adds the contrast information to the light intensity data so that the contrast of a pixel region in the two-dimensional image corresponding to the moving object detected by the difference detector is emphasized.

[7]

The image processing apparatus according to [5] or [6], wherein the contrast adder adds the contrast information to the light intensity data so that contrast is adjusted such that a sub region in which the moving object is present in the two-dimensional image has a white-based contrast and a sub region in which the moving object is not present has a back-based contrast.

[8]

The image processing apparatus according to any one of [1] to [7], further including a noise remover configured to remove, as noise, point groups except for a point group corresponding to the object in the three-dimensional data based on the object recognized by the object recognizer, wherein the clustering unit classifies the three-dimensional data, from which noise has been removed by the noise remover, into the one or more clusters.

[9]

The image processing apparatus according to [8], wherein the noise remover removes the point groups in the three-dimensional data except for the point group corresponding to the object recognized by the object recognizer.

[10]

The image processing apparatus according to any one of [1] to [5], further including a difference detector configured to detect a moving object based on a difference among a plurality of sets of the three-dimensional data generated at different points in time, wherein the clustering unit classifies each moving object detected by the difference detector into a different cluster based on the recognition result of the object recognizer and the distance to the object detected by the distance detector.

[11]

The image processing apparatus according to [10], wherein the clustering unit classifies each point group corresponding to one of the moving objects in the three-dimensional data into a different cluster.

[12]

The image processing apparatus according to any one of [6], [7], and [10], further including a magnification adjuster configured to adjust sizes of a plurality of moving objects in the two-dimensional image to those obtained when distances to the moving objects are the same based on the moving objects detected by the difference detector and the distances to the moving objects detected by the distance detector, wherein the object recognizer recognizes a plurality of objects in the two-dimensional image including the moving objects for which the sizes are adjusted by the magnification adjuster.

[13]

The image processing apparatus according to [12], wherein the magnification adjuster adjusts a size of an object, a distance to which is shorter than a predetermined distance, to be smaller depending on the distance detected by the distance detector, and a size of an object, a distance to which is longer than the predetermined distance, to be greater depending on the distance detected by the distance detector.

[14]

An image processing system including:
a light detector configured to receive reflected light from an object based on emitted light to the object;
a light intensity detector configured to detect light intensity data including at least one of a reflected light intensity of the light reflected on the object or an ambient light intensity based on an output signal from the light detector;
a two-dimensional image generator configured to generate a two-dimensional image based on the light intensity data;
an object recognizer configured to recognize the object in the two-dimensional image;
a distance detector configured to generate three-dimensional data by detecting a distance to the object based on the output signal from the light detector; and
a clustering unit configured to classify the three-dimensional data into one or more clusters based on a recognition result of the object recognizer and the distance to the object detected by the distance detector.

[15]

The image processing system according to [14], wherein:
the light detector includes photoelectric converters each corresponding to a pixel and configured to output a signal indicating whether light is detected,
the light intensity detector detects the reflected light intensity for each pixel based on a timing at which the number of photoelectric converters detecting light is the greatest, and
the two-dimensional image generator generates the two-dimensional image based on the reflected light intensity detected by the light intensity detector for each pixel.

[16]

The image processing system according to [14] or [15], wherein
the light detector includes photoelectric converters each corresponding to a pixel and configured to output a signal indicating whether light is detected,
the light intensity detector detects the ambient light intensity for each pixel at a timing except for a timing at which the number of photoelectric converters detecting light is the greatest, and
the two-dimensional image generator generates the two-dimensional image based on the ambient light intensity detected by the light intensity detector for each pixel.

[17]

The image processing system according to any one of [14] to [16], further including:
a light emitter that emits light to the object;
a difference detector configured to detect a moving object based on a difference among a plurality of sets of the three-dimensional data generated at different points in time; and
an ROI extractor configured to extract from the two-dimensional image a pixel region including the moving object detected by the difference detector as a region of interest (ROI),
wherein the light emitter controls a scanning range of the light emitted to the object based on the ROI extracted by the ROI extractor, after the light emitter controls the scanning range of the light emitted to the object based on the ROI extracted by the ROI extractor, the two-dimensional image generator generates the two-dimensional image in a range corresponding to the ROI based on the light received by the light detector.

[18]

The image processing system according to [17], wherein contrast information is added to the light intensity data so that contrast between the moving object and surrounding regions is emphasized in the two-dimensional image corresponding to the ROI.

[19]

The image processing system according to [14], further comprising a segmenter configured to classify the two-dimensional image into one or more segments based on the object recognized by the object recognizer, wherein the clustering unit classifies the three-dimensional data into the one or more clusters so as to correspond to the one or more segments.

[20]

The image processing system according to [19], wherein the segmenter classifies each object recognized by the object recognizer into a different segment.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An image processing apparatus comprising processing circuitry, the processing circuitry configured to:

acquire light intensity data including at least one of a reflected light intensity of light reflected on one or more objects or an ambient light intensity based on one or more reception signals;

generate a two-dimensional image based on the light intensity data;

recognize the one or more objects in the two-dimensional image;

generate three-dimensional data by detecting distances to the one or more objects based on the one or more reception signals; and classify the three-dimensional data into one or more clusters based on the recognized one or more objects and the distances to the detected one or more objects, wherein the processing circuitry is further configured to:

detect a plurality of moving objects based on a difference among a plurality of sets of three-dimensional data generated at different points in time;

based on the detected distances to the plurality of moving objects, adjust sizes of the plurality of moving objects in a two-dimensional image to sizes the plurality of moving objects would have if located at a same distance; and recognize the plurality of moving objects for which the sizes have been adjusted in the two-dimensional image.

2. The image processing apparatus according to claim 1, wherein the processing circuitry is further configured to classify the two-dimensional image into one or more segments based on the recognized one or more objects, wherein the three-dimensional data is classified into the one or more clusters so as to correspond to the one or more segments.

3. The image processing apparatus according to claim 2, wherein each of the recognized one or more objects is classified into a different segment.

4. The image processing apparatus according to claim 1, wherein the processing circuitry is further configured to add contrast information to the light intensity data based on the three-dimensional data, and the two-dimensional image is generated based on the light intensity data to which the contrast information has been added.

5. The image processing apparatus according to claim 4, wherein the contrast information is added to the light intensity data so that the contrast between the one or more objects and surrounding regions in the two-dimensional image is emphasized.

6. The image processing apparatus according to claim 5, wherein the contrast information is added to the light intensity data so that the contrast of a pixel region in the two-dimensional image corresponding to the detected plurality of moving objects is emphasized.

7. The image processing apparatus according to claim 5, wherein the contrast information is added to the light intensity data so that contrast is adjusted such that a sub region in which one of the plurality of moving objects is present in the two-dimensional image has a white-based contrast and a sub region in which the one of the plurality of moving objects is not present has a black-based contrast.

8. The image processing apparatus according to claim 1, wherein the processing circuitry is further configured to remove, as noise, point groups except for a point group corresponding to the one or more objects in the three-dimensional data based on the recognized one or more objects, and the three-dimensional data, from which noise has been removed, is classified into the one or more clusters.

9. The image processing apparatus according to claim 8, wherein the point groups in the three-dimensional data are removed except for the point group corresponding to the recognized one or more objects.

10. The image processing apparatus according to claim 1, wherein each of the plurality of moving objects is classified into a different cluster based on the recognized one or more objects and the detected distance.

11. The image processing apparatus according to claim 10, wherein each point group corresponding to one of the plurality of moving objects in the three-dimensional data is classified into a different cluster.

12. The image processing apparatus according to claim 1, wherein a size of one of the plurality of moving objects, a distance to which is shorter than a predetermined distance, is adjusted to be smaller depending on the detected distance, and a size of one of the plurality of moving objects, a distance to which is longer than the predetermined distance, is adjusted to be greater depending on the detected distance.

13. An image processing system comprising:

a light detector configured to receive reflected light from one or more objects; and processing circuitry, the processing circuitry configured to:

generate light intensity data including at least one of a reflected light intensity of the light reflected on the one or more objects or an ambient light intensity based on an output signal from the light detector;

generate a two-dimensional image based on the light intensity data;

recognize the one or more objects in the two-dimensional image;

generate three-dimensional data by detecting distances to the one or more objects based on the output signal from the light detector; and classify the three-dimensional data into one or more clusters based on the recognized one or more objects and the distances to the detected one or more objects, wherein the processing circuitry is further configured to:

detect a plurality of moving objects based on a difference among a plurality of sets of three-dimensional data generated at different points in time;

based on the detected distances to the plurality of moving objects, adjust sizes of the plurality of moving objects in a two-dimensional image to sizes the plurality of moving objects would have if located at a same distance; and recognize the plurality of moving objects for which the sizes have been adjusted in the two-dimensional image.

14. The image processing system according to claim 13, wherein:

the light detector includes photoelectric converters each corresponding to a pixel and configured to output a signal indicating whether light is detected, the reflected light intensity is detected for each pixel based on a timing at which the number of photoelectric converters detecting light is the greatest, and the two-dimensional image is generated based on the detected reflected light intensity for each pixel.

15. The image processing system according to claim 13, wherein the light detector includes photoelectric converters each corresponding to a pixel and configured to output a signal indicating whether light is detected, the ambient light intensity is detected for each pixel at a timing except for a timing at which the number of photoelectric converters detecting light is the greatest, and the two-dimensional image is generated based on the detected ambient light intensity for each pixel.

16. The image processing system according to claim 13, further comprising a light emitter that emits light to the one or more objects, wherein the processing circuitry is further configured to:

extract from the two-dimensional image a pixel region including the plurality of moving objects as a region of interest (ROI), the light emitter controls a scanning range of the light emitted to the one or more objects based on the extracted ROI, and after the light emitter controls the scanning range of the light emitted to the one or more objects based on the extracted ROI, the two-dimensional image is generated in a range corresponding to the ROI based on the received light.

17. The image processing system according to claim 16, wherein contrast information is added to the light intensity data so that contrast between the plurality of moving objects and surrounding regions is emphasized in the two-dimensional image corresponding to the ROI.

18. The image processing system according to claim 13, wherein the processing circuitry is further configured to classify the two-dimensional image into one or more segments based on the recognized one or more objects, and the three-dimensional data is classified into the one or more clusters so as to correspond to the one or more segments.

19. An image processing method comprising:

acquiring light intensity data including at least one of a reflected light intensity of light reflected on one or more objects or an ambient light intensity based on one or more reception signals;

generating a two-dimensional image based on the light intensity data;

recognizing the one or more objects in the two-dimensional image;

generating three-dimensional data by detecting distances to the one or more objects based on the one or more reception signals; and classifying the three-dimensional data into one or more clusters based on the recognized one or more objects and the distances to the detected one or more objects, wherein the image processing method further comprises:

detecting a plurality of moving objects based on a difference among a plurality of sets of three-dimensional data generated at different points in time;

based on the detected distances to the plurality of moving objects, adjusting sizes of the plurality of moving objects in a two-dimensional image to sizes the plurality of moving objects would have if located at a same distance; and recognizing the plurality of moving objects for which the sizes have been adjusted in the two-dimensional image.

* * * * *